United States Patent [19]
Kepros et al.

[11] 3,882,312
[45] May 6, 1975

[54] X-RAY LASERS

[75] Inventors: John G. Kepros; Edward Eyring; Fredric William Cagle, all of Salt Lake City, Utah

[73] Assignee: University of Utah, Salt Lake City, Utah

[22] Filed: June 22, 1973

[21] Appl. No.: 372,565

[52] U.S. Cl. ............................. 250/493; 331/94.5
[51] Int. Cl. ............................................ H01s 3/09
[58] Field of Search .................. 250/493; 331/94.5

[56] References Cited
UNITED STATES PATENTS
3,617,939   11/1971   Bond................................ 250/493

*Primary Examiner*—James W. Lawrence
*Assistant Examiner*—C. E. Church

[57] ABSTRACT

A method of producing collimated x-radiation by suitably subjecting metallic ions to a pulse of laser energy from a conventional laser.

10 Claims, 1 Drawing Figure

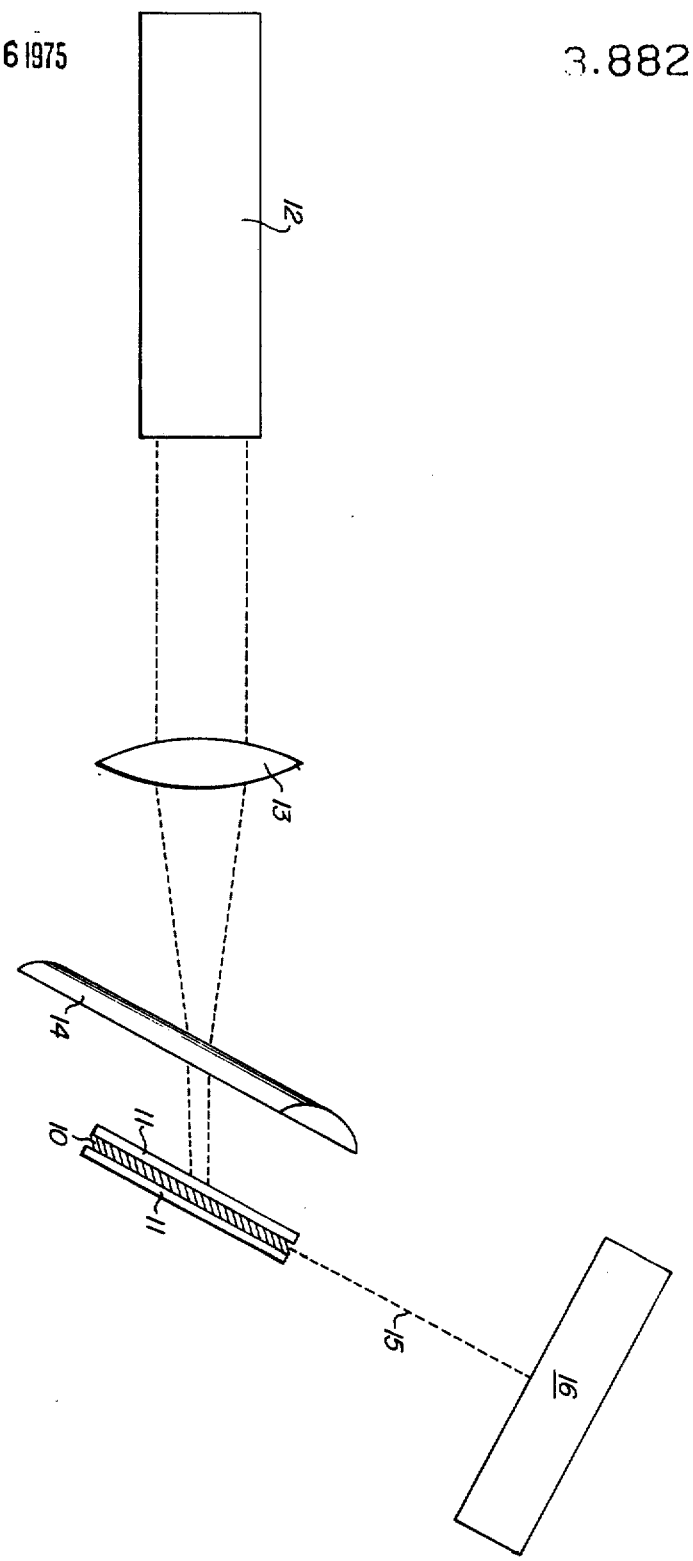

X-RAY LASERS

This invention was produced under a grant from the United States Air Force and the University of Utah, the assignee, hereby grants to the United States Government a non-exclusive, royalty-free, paid-up license for this invention for the duration of the patent.

Since the first reported Light Amplification of Stimulated Emission of Radiation (laser action in the visible spectrum) in approximately 1960, continuous progress has been made by various researchers in obtaining laser action at shorter and shorter wave lengths. It has long been felt that an x-ray laser could be developed that would radiate at x-ray wave lengths of less than 5 angstrom units. X-radiation at these wave lengths is generally referred to as a "hard" x-ray and, as such, would travel significant distances through the air. The potential uses for such hard x-radiation having the laser characteristic of being collimated are significant. For example, it may be possible for a physician to foresee the use of a highly collimated x-ray beam as a selective scalpel for use in various types of surgery. Both the chemist and biologist could possibly use x-ray holography as a means for following time dependent three dimensional phenomena at a submicroscopic level. Additionally, the interaction of intense coherent x-ray pulses with nuclei could provide valuable new information of interest to physicists.

In the present invention, the feasibility of producing coherent radiation within the x-ray wave length region has been demonstrated. Further refinements of this basic development will, of course, be forthcoming once the initial concept as taught herein is fully disclosed to those skilled in the art.

It is therefore an object of this invention to provide improvements in lasers capable of producing collimated radiation of the x-ray wave length.

It is another object of this invention to provide collimated x-radiation having a wave length of less than 5 angstrom units.

It is another object of this invention to provide a method for producing collimated x-radiation from metallic ions by subjecting said metallic ions to laser radiation of the near infrared spectrum.

These and other objects of this invention will become more fully apparent by reference to the drawing and accompanying description and the claims relating thereto.

The drawing is a schematic of the x-ray laser system and is more fully described hereinafter.

Referring to the drawing, a layer of metallic ions is shown generally at 10 and is supported as a thin layer, in this particular embodiment, by conventional microscope cover glasses 11 to form thereby a "sandwich". A laser of the near infrared spectrum is shown at 12. Radiation of the near infrared wave length is shown in outline form by dotted lines emmanating from laser 12. A conventional focusing system is shown generally at 13. A cylindrical focusing lens 14 focuses the radiation pulse from laser 12 into a near vertically linear pulse on the metallic ions 10. The x-ray laser emission produced from the metallic ions 10 is illustrated by dotted lines 15. A detection device for detecting the x-radiation 15 is shown generally at 16.

The metallic ions capable of producing x-radiation when subjected to laser energy of the near infrared wave length are ions of copper, iron, and zinc. Compounds of these metals having high solubility in water were considered in these experiments. In this case, these compounds are copper sulfate, zinc sulfate, and ferrous sulfate. For purposes of simplicity and to assist in the understanding of this invention, the description of the x-ray laser will center around the use of copper ions as the metallic ions 10. In this particular preferred embodiment, copper ions were introduced in the form of an aqueous gel of copper sulfate. Ease in handling the aqueous copper sulfate system was accomplished by the use of a gel.

As a pulse of laser radiation from cylindrical focusing lens 14 (which lens causes the pulse to be essentially focused to a line when viewed in cross section) strikes the aqueous copper sulfate gel 10, the leading edge of said pulse of radiation causes excitation of the copper ions in the gel system. As the traveling wave front of the laser pulse continues to travel along the canted aqueous gel, each succeeding part of the pulse front amplifies the previous x-radiation produced from the copper ions in the gel to produce x-radiation traveling along a line defined by the linear pulse front and colinear with the irradiated portion of the aqueous copper sulfate gel system. An angular orientation of the copper sulfate gel system to the axis of the incoming radiation pulse for the presently preferred embodiment has been found to be between approximately 6° to 25°.

In the presently preferred embodiment, the pumping source, or laser of the near infrared spectrum which is shown generally at 12, is a Q-switched, vertically polarized, ND:glass oscillator-amplifier of three stages commercially available through Apollo Lasers, Inc. This laser operates at a wave length in the near infrared spectrum of 1.06 micrometers and is controlled to produce 20-nanosecond duration pulses of about 30 joules.

The x-ray source or metallic ion (in this case, copper) gel was prepared by dilution of a 0.1 M aqueous solution of reagent grade, anhydrous copper sulfate ($CuSO_4$) to 10 or to 1 millimolar. The gel was prepared using commerically available, Knox brand unflavored gelatin and by dissolving 0.444 grams of gelatin in 28 milliliters of the diluted copper sulfate solution. The gelatin was dissolved according to the manufacturers directions on the package. A sandwich of the gel was then prepared by placing a film of the gel between two microscope cover glasses (number 1 cover glass, 0.013 cm thick). Gel films of various thicknesses (with the thickest film used being about 0.01 cm thick) were used. The position of the gel sandwich was arranged to be adjustable within the range of the focal length of the cylindrical lens 14.

Procedures used to detect the x-radiation produced from the metallic ions comprised standard photographic methods for detecting x-radiation. In one such detector system, double-emulsion, medical x-ray film was used. In this particular system, commercially available film sold under the trade name Kodak NS-392T was used. The film was protected from light by four layers of black photographic paper which had been sealed with photographic tape. The film was then wrapped in from one to four layers of 13 micrometer thick aluminum foil to prevent exposure of the film by soft x-rays and by spurious, reflected infrared laser radiation.

The property of collimation of the x-radiation produced, a prerequisite of coherence, was indicated by changing the distance of the detector 16 from the source of radiation. In each instance there was no significant increase in the size of the exposed portion of the film, thus indicating collimation. Cylindrical lens 14 and the glass, metallic ion sandwich comprising 11 and 10, respectively, were placed parallel to one another. In this arrangement, the leading edge of the Nd:glass laser pulse pumps the metallic ion gel lasing medium directly in front of material that has just been pumped. Using this method of pumping, a population inversion is created with the result that emitted x-radiation is amplified as it travels along the copper-gel plasma. It should therefore be obvious that media that require high intensity, fast rise-times, and long pumping regions to produce detectable radiation should be easily pumped by this method. On the other hand, the brute-force frontal assault, using other lens systems, results in a very short pumped region that thus limits the gain.

It has therefore been shown that this invention has produced a collimation of a beam of radiation and that said radiation was not absorbed by intervening air, layers of aluminum foil, and photographic paper, thus indicating that said collimated radiation was a hard x-radiation.

We claim:

1. A method of producing collimated radiation of the x-ray wave length comprising:
    obtaining a laser operable to produce a pulse of laser radiation in the near infrared spectrum;
    orienting a focusing system so as to focus the pulse of laser radiation into a linear beam;
    placing a layer of metallic ions in the focal range of the focusing system with the plane of the layer being transverse to the plane of the beam, the angle of the layer being between 6° and 25° to the axis of the beam; and
    triggering the laser so as to cause a pulse of laser energy to excite the metal ions thereby generating a collimated beam of x-radiation.

2. A method of producing collimated radiation of the wave length as defined in claim 1 wherein said placing step comprises preparing a layer of metallic ions comprising copper ions.

3. A method of producing collimated radiation of the wave length as defined in claim 2 wherein said preparing step comprises dissolving copper sulfate in water so as to furnish copper ions in an aqueous system.

4. A method of producing collimated radiation of the wave length as defined in claim 1 wherein said placing step comprises preparing a layer of metallic ions comprising iron ions.

5. A method of producing collimated radiation of the wave length as defined in claim 4 wherein said preparing step comprises dissolving ferrous sulfate in water so as to furnish iron ions in an aqueous system.

6. A method of producing collimated radiation of the wave length as defined in claim 1 wherein said placing step comprises preparing a layer of metallic ions comprising zinc ions.

7. A method of producing collimated radiation of the wave length as defined in claim 6 wherein said preparing step comprises dissolving zinc sulfate in water so as to furnish zinc ions in an aqueous system.

8. A method of producing collimated radiation of the wave length as defined in claim 1 wherein said obtaining step comprises acquiring a neodymium doped glass laser operable to emit laser radiation at a wave length of about 1.06 micrometers.

9. A method of producing collimated radiation of the wave length as defined in claim 8 wherein said acquiring step further comprises procuring a laser capable of emitting a pulse of laser radiation having a pulse front which arises exponentially.

10. A method of producing collimated radiation of x-ray wave length comprising:
    obtaining a laser operable to produce a beam comprising a pulse of laser radiation in the near infrared spectrum;
    placing a layer of metallic ions in the path of the beam, the plane of the layer forming an acute angle with the beam; and
    projecting a collimated beam of x-radiation directly from the layer upon striking the layer with the pulse.

* * * * *